3,030,332
Patented Apr. 17, 1962

3,030,332
COATING COMPOSITION COMPRISING A VINYL COPOLYMER, A PHENOL-ALDEHYDE RESIN AND AN EPOXY COMPOUND, METHOD FOR PREPARING SAME, AND METAL COATED THEREWITH
Louis J. Lombardi, Howard J. Wright, and Paul F. Westfall, Kansas City, Mo., assignors to Cook Paint & Varnish Company, Kansas City, Mo., a corporation of Delaware
No Drawing. Filed Apr. 21, 1960, Ser. No. 23,655
17 Claims. (Cl. 260—43)

The present invention relates to certain heat-curable, resinous compositions which form water-insoluble, cross-linked polymers on baking.

The principal object of the invention is the preparation of novel resinous products which demonstrate a wide variety of useful characteristics. For example, these products may be used as film-forming components in coating compositions or the like. Other objects will also be hereinafter apparent.

According to one aspect of the invention, the present products comprise heat-curable mixtures of a vinyl polymer with an epoxy compound in the presence of a phenolic resin which apparently functions as a curing agent when the mixture is baked. The invention also contemplates the cured, cross-linked vinyl polymer obtained by baking these mixtures. Essential details of the various components constituting the present products and other aspects of the invention, including preferred modes of operating in accordance therewith, are described below.

*Vinyl Polymer Constituent*

The vinyl polymer used as a component in preparing the products of the invention may be conveniently described as a copolymer of (*a*) an ethylenically unsaturated monomer containing at least one epoxy-reactive group selected from the class consisting of carboxylic acid and carboxylic anhydride groups and (*b*) a different ethylenically unsaturated monomer which is free from carboxylic acid and carboxylic anhydride groups, the latter monomer preferably being in excess. To be suitable for use herein, the vinyl polymer must have an acid number of 30 to 150, preferably 60 to 120.

Examples of epoxy-reactive monomers (*a*) are acrylic acid; acrylic acid substituted in the alpha carbon by lower alkyl, e.g. methacrylic acid; maleic acid and maleic anhydride.

The other monomeric component (*b*) is characterized by the group

and may be styrene, α-substituted lower alkyl styrenes such as α-methyl styrene, alkyl esters of acrylic and methacrylic acids, especially the lower alkyl esters thereof, e.g. methyl methacrylate, methyl and ethyl acrylate, and mixtures of these materials. The relative amounts of monomers (*a*) and (*b*) in the copolymer may be varied but, in any event, the copolymer must comprise sufficient amounts of monomers (*a*) and (*b*) to give an acid number within the limits indicated heretofore.

The vinyl copolymer starting component may be prepared in conventional fashion, e.g. by heating monomers (*a*) and (*b*) at elevated temperatures, usually of the order of 90 to 140° C., preferably 115° C. to 125° C. This polymerization may be carried out in bulk or in solution using conventional solvents such as aromatic hydrocarbons, typically benzene, toluene and xylene or alcohols (e.g. butyl alcohol or Cellosolve) and the like. Usually, the desired polymerization is completed in up to about 10-15 hours, depending upon other operating conditions, e.g. the monomers involved, the temperature, etc.

The polymerization is preferably carried out in the presence of a polymerization catalyst, typically, peroxides such as benzoyl peroxide, di-tertiarybutyl peroxide, dicumene peroxide and methyl-ethyl ketone peroxide, or other catalysts of the free-radical type.

The preparation of various vinyl copolymers suitable for use according to the invention is described below:

EXAMPLE I

The following mix, in weight percent, was prepared:

| | Percent |
|---|---|
| Styrene | 55 |
| α-Methyl styrene | 17 |
| Maleic anhydride | 27 |
| Di-tert butyl peroxide | 0.5 |
| Benzoyl peroxide | 0.5 |

These materials were polymerized in solution in butyl alcohol by heating at a temperature of about 115–125° C. for 10–15 hours. The mixture was then cooled and the resulting product had an acid number of 110. The composition had a viscosity of Z5 (Gardner Holdt), was 60% by weight non-volatiles (polymer) and had a weight per gallon of 8.36 pounds.

An essentially equivalent copolymer may also be obtained by polymerizing the indicated mixture by solution polymerization in Cellosolve.

In lieu of the starting mixture indicated above, the following typical reaction mixtures may be used in the same manner.

EXAMPLE II

| | Percent |
|---|---|
| Styrene | 40 |
| α-Methyl styrene | 38 |
| Acrylic acid | 20 |
| Benzoyl peroxide | 1 |
| Di-tertiary butyl peroxide | 1 |

The resulting product had the following characteristics:

Acid number about 114
Viscosity Z5
Nonvolatiles 57%
Weight/gallon 8 pounds

EXAMPLE III

| | Percent |
|---|---|
| Styrene | 36 |
| α-Methyl styrene | 32 |
| Methacrylic acid | 21 |
| Di-butyl maleate | 9 |
| Benzoyl peroxide | 1 |
| Di-tertiary butyl peroxide | 1 |

The product had the following characteristics:

Acid number 98
Viscosity Z3
Nonvolatiles 48%
Weight/gallon 7.95

EXAMPLE IV

| | Percent |
|---|---|
| Methacrylic acid | 24 |
| Methyl acrylate | 74 |
| Benzoyl peroxide | 1 |
| Di-tertiary butyl peroxide | 1 |

The product had the following characteristics:

Acid number 71
Viscosity Z2
Nonvolatiles 59%
Weight/gallon 8.20

EXAMPLE V

| | Percent |
|---|---|
| Styrene | 82 |
| Maleic anhydride | 16 |
| Benzoyl peroxide | 1 |
| Di-tertiary butyl peroxide | 1 |

The product had the following characteristics:

Acid number 65.0
Viscosity Z6 light
Nonvolatiles 58%
Weight/gallon 8.17

EXAMPLE VI

| | Percent |
|---|---|
| Methyl methacrylate | 80 |
| Methacrylic acid | 18 |
| Benzoyl peroxide | 1 |
| Di-tertiary butyl peroxide | 1 |

The product had the following characteristics:

Acid number 82.0
Viscosity Z6 heavy
Nonvolatiles 48.0%
Weight/gallon 7.94

EXAMPLE VII

The procedure of Example I was repeated substituting the following materials:

| | Percent |
|---|---|
| Styrene | 39 |
| 2-ethyl hexyl acrylate | 38 |
| Acrylic acid | 21 |
| Benzoyl peroxide | 1 |
| Di-tertiary butyl peroxide | 1 |

The product had the following characteristics:

Acid number 145.0
Viscosity Z3
Nonvolatiles 53%
Weight/gallon 7.88

EXAMPLE VIII

| | Percent |
|---|---|
| Styrene | 47 |
| α-Methyl styrene | 47 |
| Acrylic acid | 4 |
| Benzoyl peroxide | 1 |
| Di-tertiary butyl peroxide | 1 |

The products had the following characteristics:

Acid number 32.0
Viscosity U—V
Nonvolatiles 50%
Weight/gallon 8.06

It will be appreciated that various other vinyl copolymers, in addition to those described above, may be used herein for the purposes of the present invention.

Epoxy Constituent

The epoxy constituent or epoxide employed in this invention is characterized by the presence of one or more epoxy groups having the formula

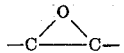

in the molecule. In general, the epoxide contains two or more epoxy groups per molecule so that it can effectively serve as a cross-linking agent. A wide variety of epoxy materials may be employed and a large number of commercially available epoxides have been tested and found satisfactory. Representative commercial types include those sold under the names "Epon Resin 828," "Admex 710" and "PAGE." Of these products, "Epon 828" is a polyglicydyl ether of bisphenol A, which is 2,2'-di (p-hydroxyphenyl) propane prepared by condensation of the phenol with epichlorohydrin. "Epon 828" is further characterized as a liquid having an epoxide equivalent of about 175 to 210 grams per gram chemical equivalent of epoxy groups, an average molecular weight of 350 to 400 and a viscosity in 40 percent butyl carbitol at 25° C., of 5,000 to 15,000 centipoises. Other epoxide compounds having the same general formula of higher or lower molecular weight are available and suitable for use herein. In general, the molecular weight for such epoxy materials is between 340 and 3,800, although epoxy materials with other molecular weights can be used.

"Admex 710" is an epoxidized oil derivative in which a naturally occurring unsaturated oil or the equivalent has been reacted with an oxygenating agent such as oxygen with selective metal catalysts, perbenzoic acid, acetaldehyde mono-peracetate and peracetic acid. Oils which can be epoxidized in this way include soy bean oil and linseed oil. The epoxidized oils have 3 to 4 epoxy groups per mole. The preparation of these materials has been described in the chemical literature (see, for example, the Encyclopedia of Chemical Technology, First Supplement, 1957, pages 638 and 639).

"PAGE" is a polyallyl glycidyl ether having the formula:

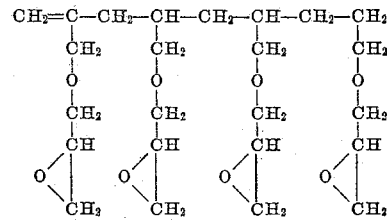

Poly (allyl glycidyl ether) is a mixture of low-molecular-weight polymers of the type shown having an average molecular weight of about 460 and an average number of epoxy groups per molecule of about 3.5.

Other types of epoxy materials may be used. In particular, the glycidyl ether derivatives of phenols similar to those of bisphenol A as illustrated by "Epon 828" may be used. Other di-hydroxy compounds which are used in the preparation of epoxy materials include di-(p-hydroxyphenyl) methane known as bisphenol F, 4,4'-dihydroxy biphenyl, and other aromatic mononuclear and aromatic polynuclear polyhydroxy compounds. Epoxide 201 (3,4-epoxy-6-methylcyclohexylmethyl-3,4-epoxy-6-methylcyclohexane carboxylate); dipentene dioxide (limonene dioxide) and dicyclopentadiene dioxide (endo isomer) are other epoxy compounds suitable for used herein.

Phenolic Constituent

The phenolic constituent may comprise the water-insoluble heat condensation product of formaldehyde and a phenol such as phenol itself, alkyl-substituted phenols, e.g. cresols and tertiary butyl phenol; and polycyclic compounds like resorcinol and bisphenol. This constituent may be prepared by heat condensation in the presence of alkaline catalysts, e.g. NH$_4$OH or NaOH at 95° to 125° C., for periods of time ranging from 8 to 16 hours. Usually, from 1 to 3 mols of formaldehyde for each mol of phenol give satisfactory products. Polymers of formaldehyde, e.g. para formaldehyde, may be used in lieu of formaldehyde.

One typical example of the preparation of a suitable phenolic constituent is shown below wherein parts and percentages are by weight unless otherwise stated:

EXAMPLE IX 47 parts phenol, 46 parts formaldehyde, 5 parts isopropanol and 2 parts ammonium hydroxide (58% aqueous solution) were mixed with a mixture of 90 parts butanol and 10 parts xylene and heated under reflux for about 10 hours while being dehydrated at azeotropic distillation at the same time. The reaction mixture was cooled and worked up for further use herein by reducing with butanol to 40% N.V. (non-volatiles).

*Vinyl/Epoxy/Phenolic*

According to the invention, the vinyl, epoxy and phenolic constituents described above are thoroughly mixed together, usually in the cold, i.e. room temperature (20–25° C.). In some instances, it is desirable to partially react the ingredients by moderately heating same (30 to 90° C.) while mixing although this partial reaction before baking is not necessary in all cases.

While proportions can be fairly widely varied, it is generally desirable to use sufficient vinyl copolymer and epoxy compound to provide approximately equivalent amounts of acid groups in the vinyl copolymer and epoxy groups in the epoxy compound. The phenolic should be used in approximately equal weight to the epoxy compound. One especially preferred mix comprises 50% vinyl copolymer, containing acid groups, 25% phenolic resin and 25% epoxy containing epoxide groups, the acid groups in the copolymer and the epoxide groups being present in equivalent amounts.

The following specific examples illustrate typical compositions prepared according to the invention using the vinyl, epoxy and phenolic materials heretofore described, parts being by weight unless otherwise indicated:

EXAMPLE X 40 parts of the vinyl copolymer solution prepared in Example I were mixed with 12 parts of epoxy (i.e. Admex 710) and 24 parts of the phenolic resin solution prepared in Example IX at room temperature (20° C.). The resulting mix was applied directly to a metal substrate (e.g. tin plate) and cured by baking at about 200° C. for about 10 minutes. A highly satisfactory film was obtained on the substrate.

EXAMPLE XI 40 parts of the resin solution prepared in Example II were mixed with 12 parts of epoxy (i.e. Epon 828) and 30 parts of the phenolic resin solution prepared in Example IX and the resulting product coated onto a substrate, all in the manner of Example X, with satisfactory results.

It will be appreciated that, in addition to the vinyl/epoxy/phenolic products exemplified above, highly desirable films are also obtainable using any other combination of the indicated three constituents within the limits prescribed. These constituents are used in conjunction with any appropriate organic solvent and/or other diluent in sufficient amount to give a desirable coating viscosity. The necessary amount of diluent may be added at the time of mixing if desired or in the preparation of the individual components. Usually, these compositions with appropriate diluent will require baking at temperatures between 150° and 210° C., preferably 175° to 210° C., for from 15 to 30 minutes to give an effective film. Other conventional ingredients for coating compositions, e.g. fillers, pigments, etc., may also be included therein.

While preferred embodiments of the invention have been described above, various modifications may be made therein without departing from the scope of the invention as set forth in the claims wherein we claim:

1. A non-aqueous coating composition comprising a mixture of
   (1) a vinyl copolymer of
      (a) an ethylenically unsaturated monomer containing an epoxy-reactive group selected from the group consisting of acrylic acid, acrylic acids substituted in the alpha-position with lower alkyl, maleic acid and maleic anhydride and
      (b) an ethylenically unsaturated monomer selected from the group consisting of styrene, styrenes substituted with lower alkyl in the alpha position, alkyl esters of acrylic acid and alkyl esters of acrylic acid substituted in the alpha position with lower alkyl, said vinyl copolymer having an acid number of 30 to 150,
   (2) an epoxy compound and
   (3) a phenol-aldehyde resinous condensate.

2. The resinous composition of claim 1 wherein said phenol-aldehyde is a water-insoluble phenol-formaldehyde condensation product.

3. A resinous composition as set forth in claim 1 in which the vinyl copolymer is a copolymer containing maleic anhydride.

4. A resinous composition as set forth in claim 1 in which the vinyl copolymer is a copolymer containing acrylic acid.

5. A resinous composition as set forth in claim 1 in which the vinyl copolymer is a copolymer containing methacrylic acid.

6. A resinous composition as set forth in claim 1 in which the vinyl copolymer is a copolymer containing styrene.

7. A resinous composition as set forth in claim 1 in which the vinyl copolymer is a copolymer containing α-methyl styrene.

8. A resinous composition as set forth in claim 1 in which the vinyl copolymer is a copolymer containing methyl methacrylate.

9. A resinous composition as set forth in claim 1 in which the epoxy compound is the polyglycidyl ether of 2,2′-di(p-hydroxyphenyl) propane.

10. The method which comprises coating a metal substrate with the composition of claim 1 and then baking said substrate at a temperature between 150° C. and 210° C. for 15 to 30 minutes.

11. The coated metal product obtained by the method of claim 10.

12. The resinous composition of claim 1 containing approximately equivalent amounts of epoxy-reactive groups in said copolymer and epoxy groups in said epoxy compound.

13. The resinous composition of claim 12 wherein the epoxy compound and phenol-aldehyde resinous condensate are present in approximately equal amounts by weight.

14. The cross-linked product obtained by heat curing the resinous composition of claim 1.

15. A resinous coating composition according to claim 1 comprising, by weight, 50% of the vinyl copolymer, 25% of the phenolic resin and 25% epoxy, the acid groups in the copolymer and the epoxide groups being present in equivalent amounts.

16. A method for preparing the non-aqueous coating composition which comprises mixing together
   (1) a vinyl copolymer of
   (a) an ethylenically unsaturated monomer containing an epoxy-reactive group selected from the group consisting of acrylic acid, acrylic acids substituted in the alpha-position with lower alkyl, maleic acid and maleic anhydride and
   (b) an ethylenically unsaturated monomer selected from the group consisting of styrene, styrenes substituted with lower alkyl in the alpha position, alkyl esters of acrylic acid and alkyl esters of acrylic acid substituted in the alpha position with lower alkyl, said vinyl copolymer having an acid number of 30 to 150,
   (2) an epoxy compound and
   (3) a phenol-aldehyde resinous condensate.

17. The method of claim 16 wherein the mixing is carried out at 30–90° C.

References Cited in the file of this patent

UNITED STATES PATENTS

| | | |
|---|---|---|
| 2,787,603 | Sanders | Apr. 2, 1957 |
| 2,931,742 | Hicks | Apr. 5, 1960 |